US006584401B2

(12) United States Patent
Kirshenbaum et al.

(10) Patent No.: US 6,584,401 B2
(45) Date of Patent: Jun. 24, 2003

(54) AUTOMATIC GATHERING AND ANALYSIS OF DATA ON COMMUTE PATHS

(75) Inventors: Evan R. Kirshenbaum, Mountain View, CA (US); Kave Eshghi, Los Altos, CA (US); Henri Jacques Suemondt, Mountain View, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/995,349

(22) Filed: Nov. 27, 2001

(65) Prior Publication Data

US 2003/0100993 A1 May 29, 2003

(51) Int. Cl.[7] ............................................... G01C 21/26
(52) U.S. Cl. ...................... 701/202; 701/117; 701/118; 701/210; 340/905
(58) Field of Search ................................ 701/117, 118, 701/119, 202, 209, 210; 340/905, 988

(56) References Cited

U.S. PATENT DOCUMENTS

| | | | | |
|---|---|---|---|---|
| 5,774,827 A | * | 6/1998 | Smith, Jr. et al. | 701/209 |
| 5,835,026 A | * | 11/1998 | Wicks et al. | 340/905 |
| 5,850,190 A | * | 12/1998 | Wicks et al. | 340/905 |
| 6,466,862 B1 | * | 10/2002 | DeKock et al. | 701/117 |

* cited by examiner

Primary Examiner—Gertrude Arthur (57) ABSTRACT

A method and apparatus for automatically gathering data on paths taken by a number of commuters and then analyzed to provide recommendations for improving the commute experience. Data may be gathered by recording time and position data from a global positioning system (GPS) receiver the commuter carries, recording time and position data from a mobile phone the commuter carries, departure or arrival indications, or a commute log. Commute data may be augmented with a likely route generated based on a start point, an end point, and a map. Commute data may be analyzed by determining a subset of the commuters whose paths are similar. For example, they have a similar start point, a similar end point, a similar start point and a similar end point, a start point similar to a particular point, an end point similar to a particular point, or similar start and end points.

33 Claims, 5 Drawing Sheets

AUTOMATIC GATHERING AND ANALYSIS OF DATA ON COMMUTE PATHS

BACKGROUND OF THE INVENTION

1. Field of the Invention

The invention relates to the field of improving commute traffic, more specifically, to automatic gathering of data over a period of time on paths taken by commuters and the analysis of this data to provide recommendations for improvements.

2. Description of Related Art

Commute traffic and the time people spend commuting is a major deterrent to quality of life in many metropolitan and suburban areas. This is true within the United States as well as in other industrialized nations and even in some not so industrialized nations. The problem is not new and numerous attempts to solve or at least improve it have been made. Nevertheless, there are few locations in which commute traffic levels or commute times have decreased.

One of the simplest approaches to this problem is carpooling, where two or more commuters drive to work together. Despite its simplicity, carpooling has enormous potential to substantially aid in solving the problem. If one out of five of the commuters along a given route would carpool with a single other commuter, then traffic would be cut by about 10%, which, in practical terms, is substantial.

Vanpooling is where a six- to twelve-passenger vehicle, perhaps sponsored by the commuters' employer or employers, is used primarily for commuting. If one out of twenty of the commuters along a given route would vanpool with five other commuters, then traffic would be cut by 4%.

The traffic-carrying capacity of many roads diminishes dramatically once a threshold is reached such that those roads have backups or stop-and-go traffic. Thus, a reduction in vehicles of a particular percentage sometimes results in an overall reduction in commute time that is substantially larger than that percentage. Additionally, in situations where carpooling or vanpooling makes those commuters who participate eligible to use special carpool lanes, there can be a dramatic reduction in commute time for those commuters.

Despite the effectiveness of carpooling and vanpooling, and the simplicity of carpooling, such methods are not in widespread use in most areas with commute traffic problems. A typical passenger car used for commuting can hold three or more adults comfortably, yet studies and common experience indicate that most such cars convey only a single person to and from their place of employment.

But who should a particular commuter ride with? Some extroverts may be acquainted with most of the neighbors on their street and most of the employees within their business (or business unit if employed by a large company), but many people are not. However, even the set of people known by an unusual person are only a small fraction of those with whom it may make sense to carpool.

Group travel may work well by combining the commute of people who live and work within, for example, five to ten minutes of each other. Traveling together may even work well for a commuter whose start or end point is not close to the start or end point of their potential carpool partner, but is along their way. If a particular commuter's start point and end point are urban or suburban, then there may be a hundred or more other commuters who live where they may be reasonable commute partners, and another hundred or more who work at a suitable end point. The trick is to find within this several commuters at least one commuter with a suitable start point, a suitable end point, and suitable commute times.

Thus, an individual commuter is likely to find it daunting to attempt to find partners for a carpool or a vanpool. A major factor that inhibits adopting group travel is the complexity involved in the process of a commuter finding out who they can reasonably ride with.

SUMMARY OF THE INVENTION

Accordingly, there is a need for a means for gathering data over a period of time on paths taken by a number of commuters and for analyzing this data to provide recommendations for commute improvements.

Broadly speaking, according to the invention commute-path data is gathered and analyzed by receiving and inputting an indication that a number of commuters will participate, by gathering data over a period of time on the commute paths taken by the participating commuters, and by analyzing the commute path data and providing recommendations based thereon automatically by means of a computer.

In some embodiments, the enrollment indication specifies a privacy setting for the commuter, a commute constraint or preference for the commuter or a method for gathering the commute path data for the commuter, or any, some or all of these constraints.

In other embodiments, the commute path data may alternatively be gathered by: recording time and position data from a global positioning system (GPS) receiver that the commuter carries; recording time and position data from a mobile phone that the commuter carries; receiving a departure indication from the commuter; receiving an arrival indication from the commuter; or receiving a commute log from the commuter.

In yet other embodiments, the commute path data is augmented with a likely route that is automatically generated based on a start point, an end point and a map.

In some embodiments, the commute path data is analyzed by employing a similarity metric for determining a subset of the commuters whose commute paths are similar. The similarities examined may include, but are not limited to: having a similar start point; having a similar end point; having a similar start point and a similar end point; having a start point similar to a particular point; having an end point similar to a particular point; having a start point similar to a first particular point and an end point similar to a second particular point; having a start point close to a particular trajectory; having an end point close to a particular trajectory; having a trajectory close to a particular start point; and having a trajectory close to a particular end point.

In other embodiments, the output recommendations may include, but are not limited to: suggesting that a subset of commuters carpool; suggesting that a subset of commuters vanpool; suggesting that a subset of commuters take a mass transit route; suggesting that a subset of commuters take a mass transit route augmented with a last mile service; suggesting that a subset of commuters alter their commute time of day; and suggesting that a subset of commuters alter their commute route.

These and other aspects, features and advantages of the invention will be apparent to those skilled in the art after reading the following description and studying the drawing Figures.

DESCRIPTION OF THE DRAWING

The drawing illustrates technologies related to the invention, shows example embodiments of the invention, and gives examples of using the invention. The objects, advantages and features of the invention will be more clearly perceived from the following detailed description, when read in conjunction with the accompanying drawing, in which.

DETAILED DESCRIPTION OF THE PREFERRED EMBODIMENTS

The descriptions and discussions herein illustrate technologies related to the invention, show examples of the invention and give examples of using the invention. Known methods, procedures, systems, circuits or components may be discussed without giving details, so as to avoid obscuring the principles of the invention. On the other hand, numerous details of specific examples of the invention may be described, even though such details may not apply to other embodiments of the invention. Details are included and omitted so as to better explain the invention and so as to facilitate understanding of the invention.

The invention is not to be understood as being limited to or defined by what is discussed herein. Rather, the invention may be practiced without some of the specific details described herein. One skilled in the art will realize that numerous modifications, variations, selections among alternatives, changes in form, and improvements can be made without departing from the principles, spirit or legal scope of the invention.

Some descriptions herein use abstract or general terms including, but not limited to, symbol, number, bit, procedure, step, and block. Those skilled in the art use such terms as a convenient nomenclature for data and operations within a computer, digital device or electromechanical system. Such data and operations are represented by physical properties of actual objects such as electronic voltage, magnetic field and optical reflectivity. Similarly, perceptive or mental terms including, but not limited to, detect, sense, recall, present, compare, process, manipulate, analyze, and determine may also refer to such data and operations or to manipulations of such physical properties.

Figure 1:
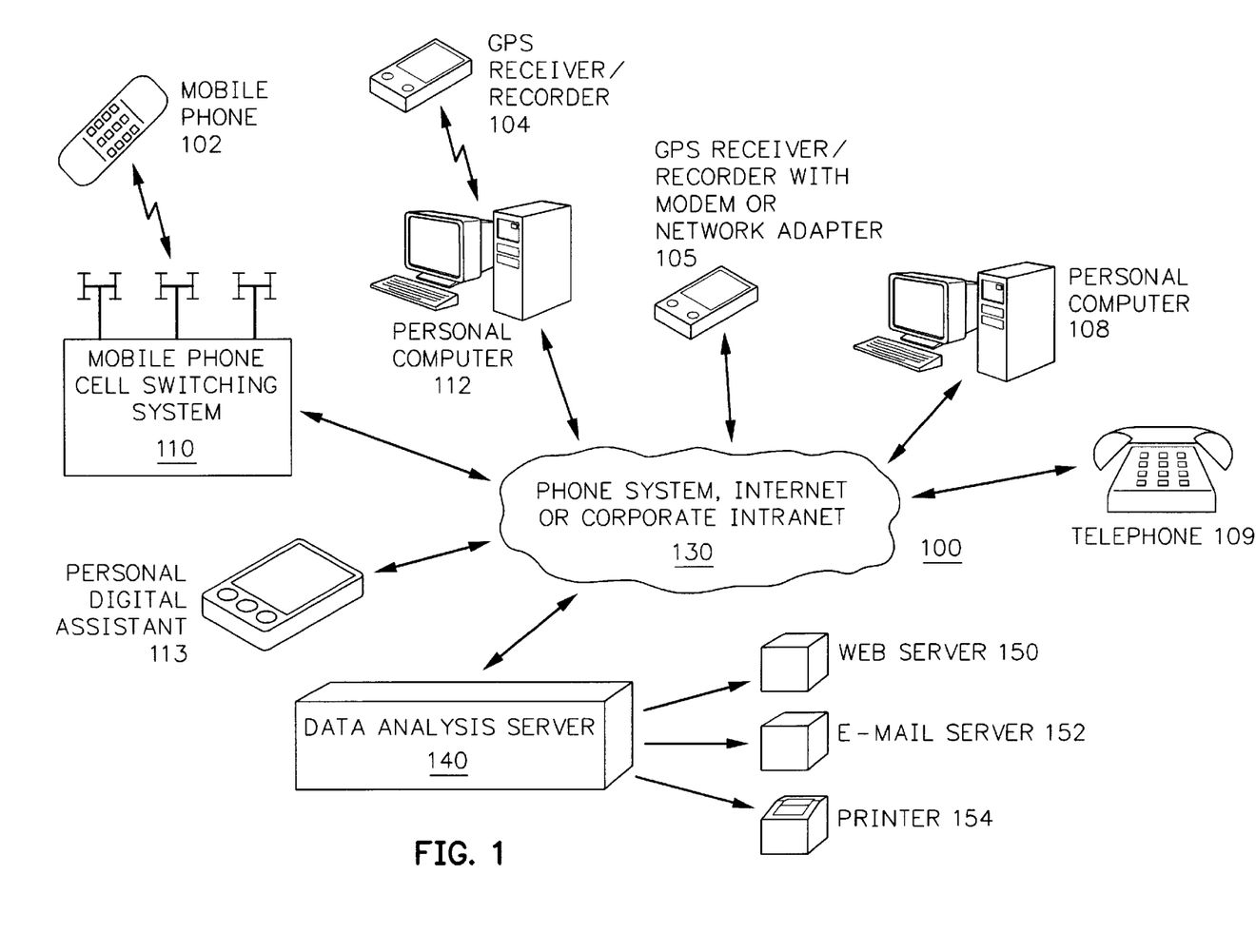
FIG. 1 is a block diagram showing the various devices, according to some embodiments of the invention, that may be used to gather data on commute paths, their interconnections to communicate the commute path data to an analysis server, and its interconnections to output devices.

With reference now to the drawing, FIG. 1 is a block diagram of an exemplary commute path data gathering and analysis system 100 according to the invention. Data on commute paths may be gathered by various devices including, but not limited to, those devices shown in FIG. 1. Various couplings such as those shown may be used to communicate the commute path data to a data analysis server. Various output devices, such as those shown in FIG. 1, may be used to present the recommendations based on the results of the analysis.

One advantage of some embodiments of the invention is the easy and unobtrusive manner in which they gather commute path data. For example, mobile phone 102 in conjunction with mobile phone cell switching system 110 may be used to gather commute path data. Such input means allow the commuter's involvement to be limited to simply enrolling in the system and receiving its recommendations.

Another advantage of using such devices directly derives from the ease with which a commuter may participate. Because it is easy to participate, more commuters are likely to enroll. This will increase the likelihood of finding a match among commute trajectories, which in turn will increase the likelihood that a recommendation from the system is successfully adopted.

In this example, mobile phone cell switching system 110 records data indicating the specific location of mobile phone 102 at any particular moment, as well as the time when it is in that location. In order for this to function effectively, each enrolled commuter simply carries mobile phone 102 during each commute trip for which data is to be gathered. Mobile phone 102 must be switched on, but it need not be in use. During or after the commute, mobile phone cell switching system 110 transfers the commute path data to data analysis server 140 via coupling 130. Coupling 130 may include, but is not limited to, the public telephone switched network (PTSN), the Internet, or a corporate or private intranet.

Additionally or alternatively, commute path data may be gathered by global positioning system (GPS) receiver/recorder 104, or by GPS receiver/recorder with modem on network adapter 105. Again, the commuter carries one of these devices, and has it operational for each commute trip for which commute data is to be gathered.

Such GPS-based embodiments require the commuter to upload the commute path data gathered by the GPS device. The upload process transfers this data from the GPS device to data analysis server 140, perhaps via an intermediate computer such as personal computer (PC) 112. The upload process may require a minute or two of the commuter's time. The upload process may be done periodically, or just once at the end of the period of time during which commute data is gathered.

For the sake of privacy, the upload process may allow the user to specify the times of day and days of the week for which commute path data is to be transferred. Thus, the commuter is not sharing location information at other times. Alternatively, the upload process may allow the user to delete certain travel trajectory segments that are private, that are irrelevant to commute path analysis or that might confuse commute path analysis.

Commute data may be gathered for as little as a day, if a commuter explicitly provides the days of the week which he commutes. Alternatively, if commute path data is gathered for a week, then the analysis can automatically infer the days of the week that the commuter works. Alternatively, the data gathering process may be continued for a longer time, such as a month, or indefinitely.

As shown in the embodiment of FIG. 1, GPS receiver/recorder 104 first communicates the commute path data it gathers to personal computer 112. This communications link may be via a device including, but not limited to, floppy disk, infrared (IR) light, flash memory card, or memory stick. Subsequently, PC 112 uploads or communicates the commute path data to data analysis server 140, typically via coupling 130. GPS receiver/recorder with modem or network adapter 105 is capable of interfacing directly with coupling 130 in order to communicate the commute path data to the data analysis server.

Additionally or alternatively, commute path data may be gathered by the user entering the data into personal digital assistant 113 as or shortly after the commute is completed. Like the GPS based embodiments, some versions of PDA 113 may be able to communicate the commute path data to data analysis server 140 directly via coupling 130, while others may use PC 112 as an intermediary during the upload process. Entering commute path data into PDA 113 by the user may be facilitated by the PDA having speech recognition capabilities.

Additionally or alternatively, the commuter may submit commute path data via telephone 109 or via personal computer 108, which is linked to data analysis server 140 via coupling 130. The commuter could call a particular phone number each morning from home just before leaving and each evening just after arriving. The commuter could Ah also send an electronic mail (e-mail) or click on a button on a web page just after arriving at work and just before leaving for home.

Having the commuter explicitly enter such arrival and departure indications, or alternatively, a log of commutes for a period of time, is more burdensome to the user than the above more passive ways that use a mobile phone or GPS device. In addition to the times, the commuter must also enter the commute route, though presumably that need only be entered once because it typically does not change from day to day. However, these embodiments allow more privacy, or at least provide an untrusting commuter with more apparent privacy than ones that automatically log commute movements. Further, these embodiments do not require a commuter to have a mobile phone, a GPS receiver/recorder or a PDA in order to participate in the commute analysis program.

Data analysis server 140 analyses the commute path data from a number of commuters and, based on the results of that analysis, and employing appropriate similarity metrics (one or more of those mentioned herein or others yet to be determined), provides to various output devices recommendations for improvements to commute paths, times or practices. Suitable output devices include, but are not limited to, web server 150, e-mail server 152, and printer 154. Enrolled commuters may access web server 150 so as to see, perhaps graphically, the recommendations for them. Subject to privacy concerns, they may be able to communicate with on-line potential commute partners or to choose among various potential partners identified by the analysis of the commute path data. E-mail server 152 may generate e-mail addressed to enrolled participants, providing recommendations for them, or addressed to the employers of enrolled participants with the recommendations for them. Printer 154 may print letters or memos containing the recommendations.

These recommendations may be provided exclusively and directly to the enrolled commuters that are involved in a particular recommendation, which may help ensure privacy. Alternatively or additionally, the recommendations may be provided to the employer or employers of a subset of the commuters, or of all of the commuters, which may facilitate setting up vanpools, or setting up a shuttle service for the so called "last mile" between a work site and a mass transit depot or stop. Recommendations may be provided to planners for mass transit systems—for example, a recommendation that there would be a market for a bus route having a particular trajectory at a particular time.

Figure 2:
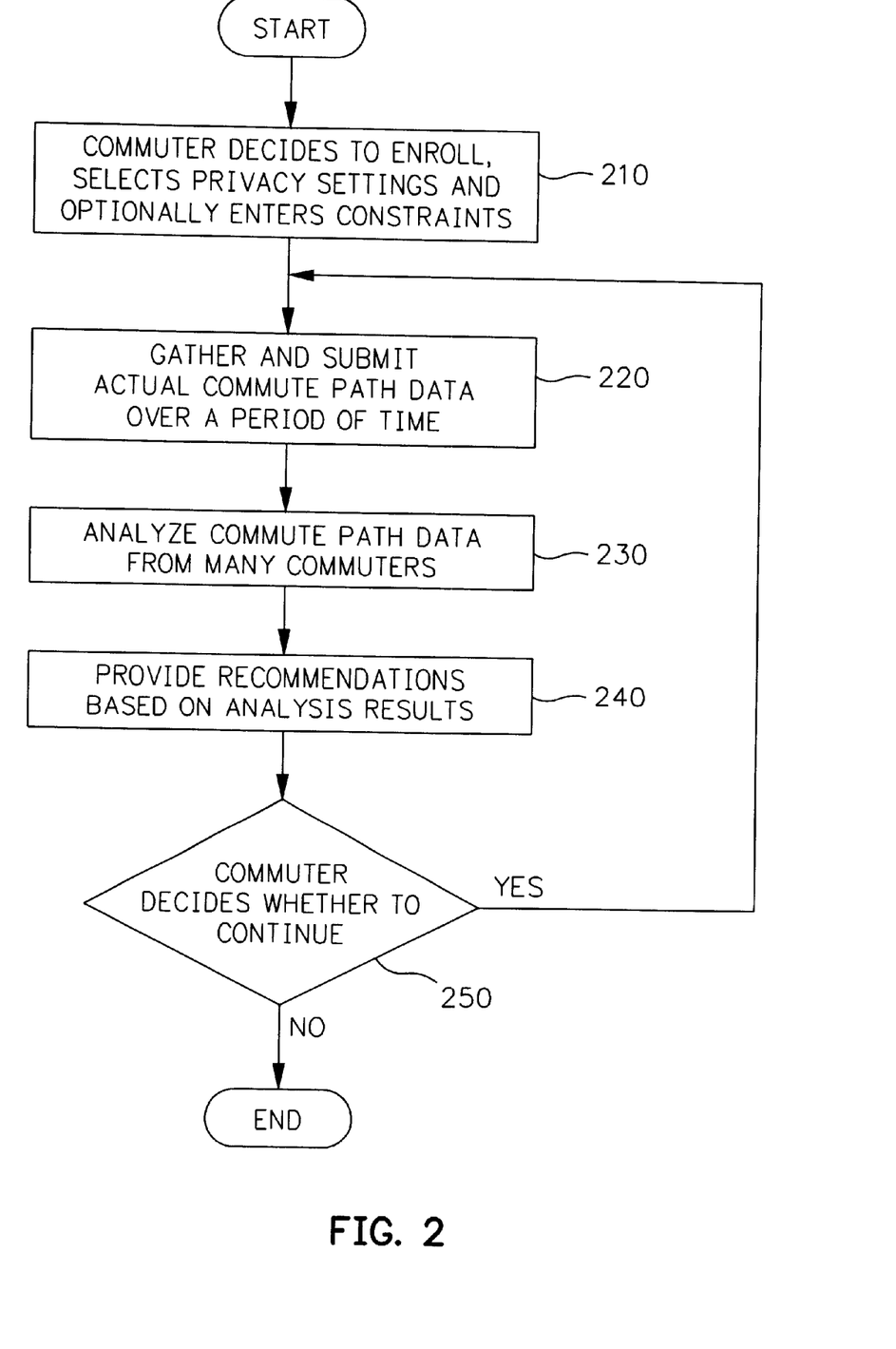
FIG. 2 is a flow diagram showing the steps involved, according to some embodiments of the invention, in gathering and analyzing commute path data.

FIG. 2 is a flow chart of the process of gathering and analyzing commute-path data, according to some embodiments of the invention. The process starts with step 210, in which a particular commuter decides to enroll in a particular commute path analysis another program or service. In some embodiments of the invention, as part of the enrollment process the commuter selects privacy settings that apply to the information that the commuter submits and that is gathered about the commuter. These may include preferences as to how and when potential commuter partners may contact the enrolling commuter, whether information may be shared with the employer of the commuter, whether information may be shared with mass transit planners, among others. For example, some commuters may not be willing to have potential commute partners be able to contact them until the commuter has reviewed that partner's start point, end point and commute times so as to verify that ride sharing might be workable. Other commuters may be willing to make their e-mail addresses available to potential commute partners, but not their phone number or residence address. Yet other commuters may be willing to communicate with potential commute partners via e-mail anonymously as forwarded by e-mail server 152.

In some embodiments of the invention, step 210 may optionally include commuter-provided constraints that are to be applied in selecting potential commute partners, such as, "I must pick my child up from day care by 5 PM," or "I prefer to leave after 8:30 AM". These two examples of constraints could be inferred by data analysis server 140 given sufficient commute path data for that commuter. However, there are other constraints that would not be apparent from commute path data alone, such as, "I will only carpool with another woman" or "I prefer a vanpool to a carpool."

Next, in step 220, commute path data is gathered and submitted to data analysis server 140 for each enrolled commuter. This process is discussed herein with reference to FIG. 1.

In step 230, data analysis server 140 analyzes the commute path data from all of the enrolled commuters to generate analysis results. This process is discussed below in reference to FIG. 4.

Next, in step 240, data analysis server 140 provides recommendations to one or more output devices, the recommendations being based on the analysis results.

Step 250 occurs after a particular enrolled commuter sees the recommendations generated for him. The commuter may decide to remain enrolled in the program, in which case step 220 repeats or continues. The commuter may decide to discontinue with the program, in which case the analysis ends and no further analysis is done on the commute path data gathered for that commuter. To enhance a commuter's privacy, some embodiments of the invention delete all information submitted or gathered about that commuter when he decides not to continue.

Figure 3:
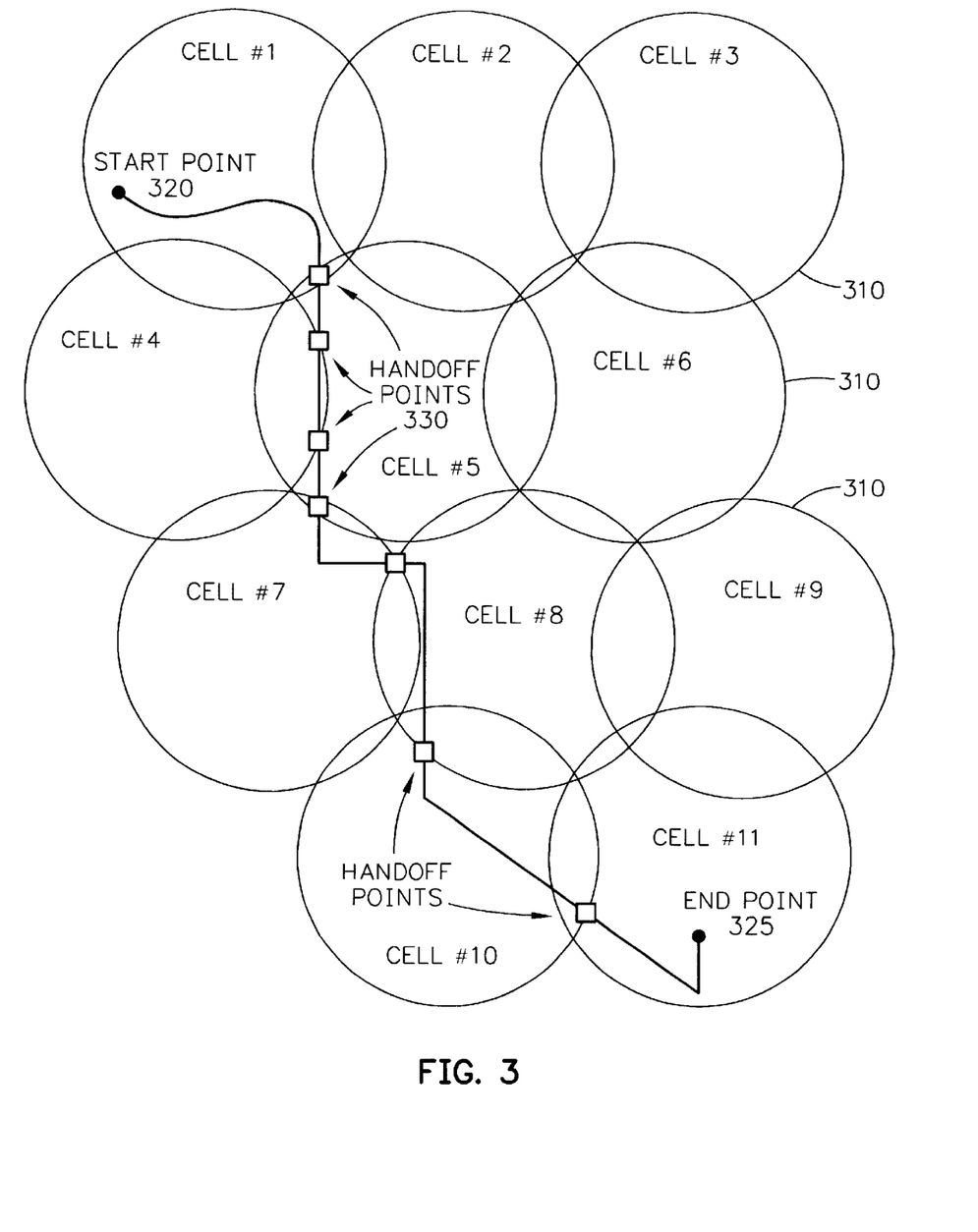
FIG. 3 shows how, according to some embodiments of the invention, the cell ranges of an example mobile phone system map onto an example commute path.

FIG. 3 is a map of the cell ranges of an example mobile phone system. It shows how, according to some embodiments of the invention, these cell ranges map onto an example commute path. Many mobile phone systems rely on a network of geographically distributed transceivers. Each transceiver, which is usually mounted on a pole, tower or tall building, typically provides communications to those mobile phones that are in a line of sight with the transceiver and that are within a limited distance of the transceiver. Each cell 310 illustrates the range of one transceiver. As shown by the matrix of overlapping cells 310, coverage can be provided with few, if any, dead spots where a mobile phone cannot communicate with any transceiver on the network by locating the transceivers sufficiently close to each other.

If a commuter is using their mobile phone as they commute, then the phone call is handed off from one transceiver to another at various points. This handoff process is controlled by mobile phone cell switching system 110 (FIG. 1). In the example path from start point 320 to end point 325, there are seven handoff points 330. In some embodiments of the invention, mobile phone cell switching system 110 records the date and time at which the mobile phone of each enrolled commuter passes each handoff point.

Given the handoff-point information and given map information of the roads in the area, the data analysis server can infer the commuter's route with a reasonable degree of accuracy. In some embodiments of the invention, this analysis takes into account factors including, but not limited to, the fact that the handoff points are not deterministic, and which roads are major ones more likely to be used to get from start point 320 to end point 325. It should be noted that map-based analysis, combined with the sort of "probable route generation" used by map servers, can be used to determine a "most plausible" route to match a sequence of call handoffs.

An example of non-determinism in handoff points 330 is shown between cell #4 and cell #5 in FIG. 3. The commuter's trajectory is within range of both the transceiver for cell #4 and the transceiver for cell #5, so mobile phone cell switching system 110 could use either to communicate with the commuter's mobile phone. Thus, one day's commute path date may show a handoff from cell #5 to cell #4, followed by a handoff from cell #4 back to cell #5 and another day's data may have neither, even though the commuter did not alter his route.

The commuter need not be using their mobile phone during their commute in order for this information to be generated and recorded. When a typical mobile phone is turned on, it broadcasts identification information and waits for a response from a nearby transceiver. By this mechanism, mobile phone cell switching system 110 is able to know which mobile phones are currently reachable via which transceivers. Switching system 110 is thereby able to avoid having every transceiver in the system broadcast every incoming call (and, of course, listen for a response back from the one mobile phone to which the call is addressed).

Figure 4:
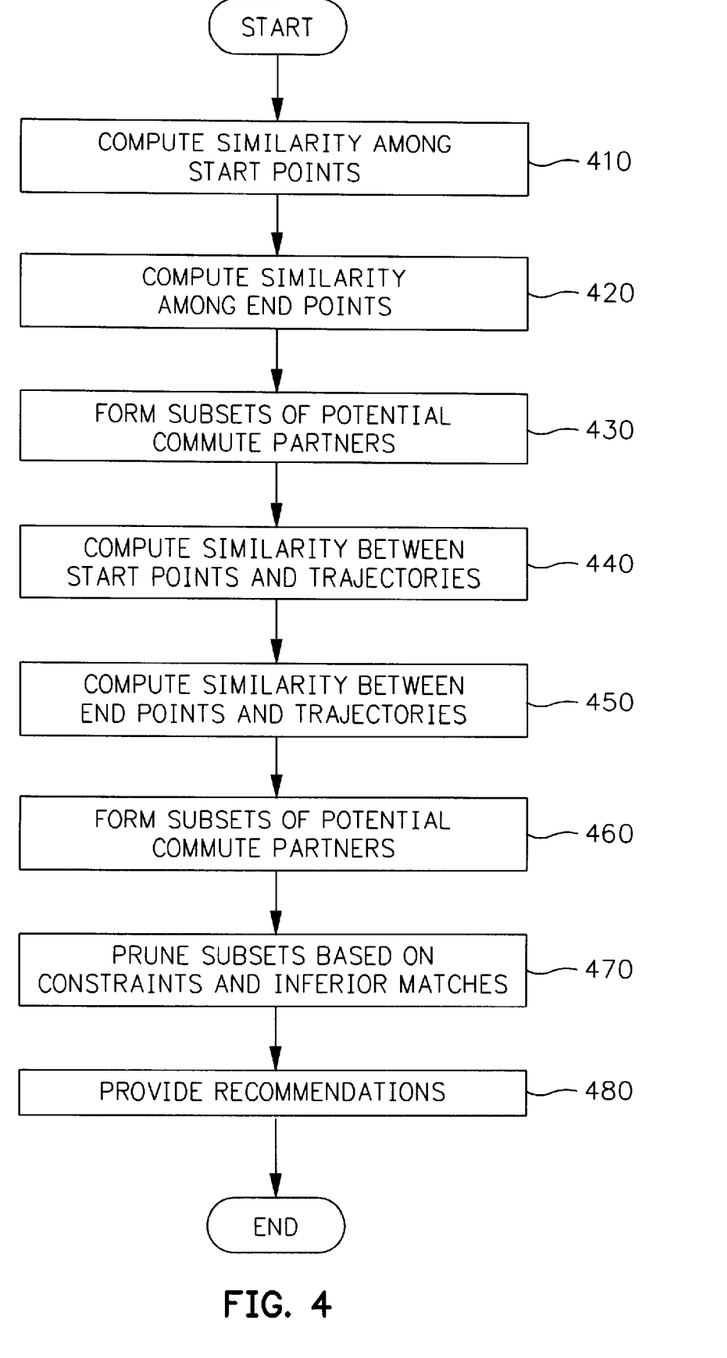
FIG. 4 is a flow diagram showing the steps involved, according to some embodiments of the invention, in analyzing the commute path data.

FIG. 4 is a flow chart of the process of analyzing commute path data, according to some embodiments of the invention. This commute path data analysis process starts with step 410, in which a measure of similarity among start points is computed. In some embodiments of the invention start points of all enrolled commuters are considered, and in others only commuters meeting certain criteria are considered, such as, "Commuter is employed by company ABC and thus is eligible for a company sponsored vanpool".

Different embodiments of the invention may use different measures of similarity among start points, among end points, and between points and trajectories. A simple measure of similarity is straight-line distance. Straight-line distance may be sufficient, or it may be a useful first approximation to rule out consideration of unreasonable matches to be followed up with a measure of travel time along an automatically generated route between the points of interest, or the point of interest and the point on the trajectory that is closest to the point of interest. Geographical or man-made features may impose potentially varied measures of distance. There are buildings in New Jersey, for example, that are separated by less than one hundred yards, but because an expressway runs between them it is complicated and time consuming to drive from one to the other.

In step 420 the similarity among end points is computed. The above considerations of what commuters are considered and how similarity is computed apply to this step.

Next, in step 430, the enrolled commuters being analyzed are placed into subsets, where each subset has similar start and end points. Each subset that contains more than one commuter represents at least two commuters for whom some form of ride sharing may be reasonable.

Some embodiments of the invention next continue on to steps 440 and 450, in which the similarity is computed between the start and points of each commuter and the trajectory of each other commuter. The above considerations of what commuters are considered and how similarity is computed apply to this step. Also, the commuters whose start and end points are considered may be limited to those for whom no potential commute partners were found in step 430. Then in step 460, the subsets of commuters are updated to include potential matches found by considering the "along the way" pick-ups and drop-offs identified in steps 440 and 450.

In step 470 the subsets of potential matches are examined in the light of other information available to data analysis server 140. Such information includes, but is not limited to, the time of day that each particular commuter drives, the days of the week that a commuter drives, the constraints that the commuter submitted when enrolling or in subsequent updates, and the number of commuters in a particular subset. For example, if there is a subset of twenty commuters whose start and end points are similar, then the subset can be eliminated and replaced with several subsets having start and end points that are even more similar.

Next, in step 480, recommendations are formulated and outputs made, based on the subsets and on other information available to data analysis server 140. Such other information may include, for example:

the availability of sponsors for vanpools or last mile services, to recommend such aids;

the availability of mass transit routes, to recommend that a commuter use such, perhaps supplemented with a last mile service;

commuters having similar start and end points but significantly different commute times, to recommend for changes in commute time or route; or traffic loading at various times of the day, to recommend changes in commute times.

Figure 5:
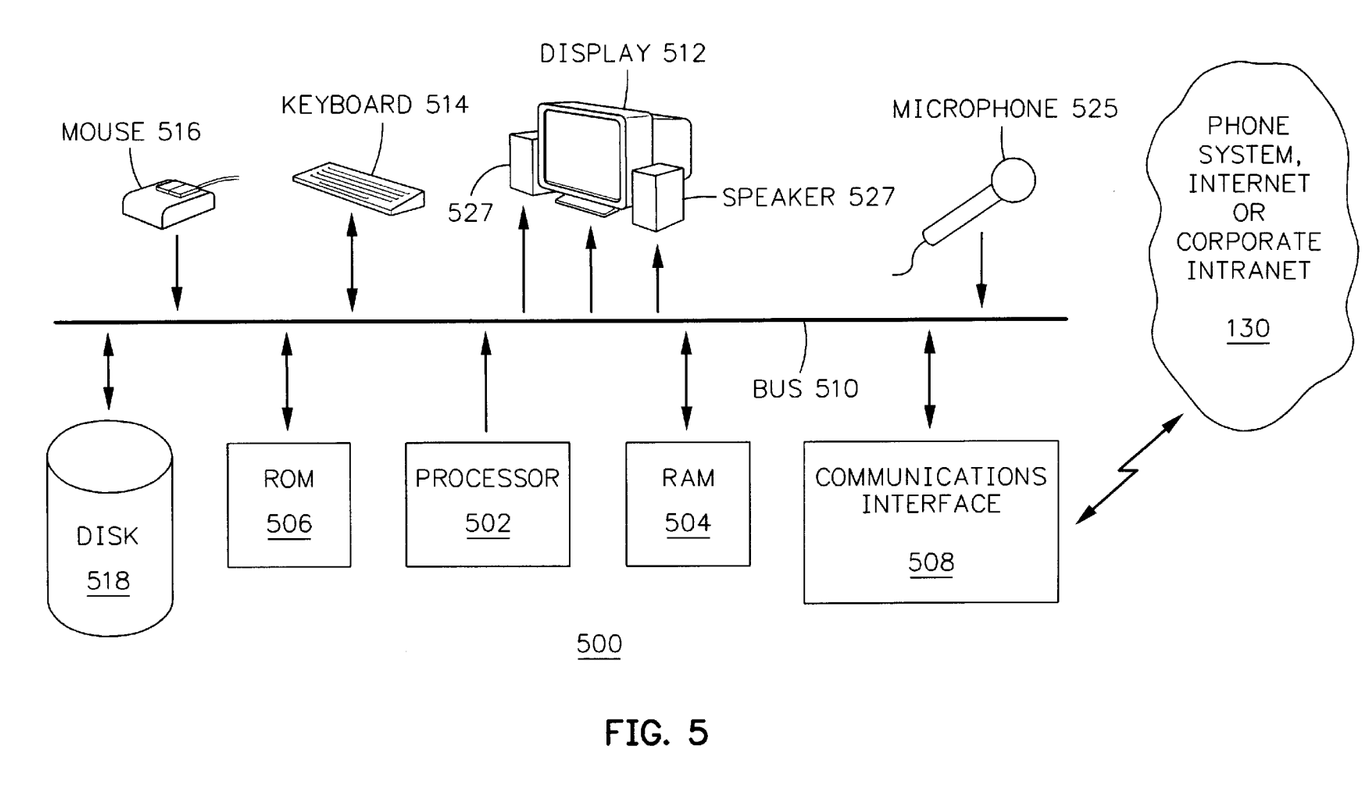
FIG. 5 is a block diagram showing the functional components and their interconnections of a computer system that may be used in accordance with some embodiments of the invention.

FIG. 5 is a block diagram of an exemplary computer system that can be used in some embodiments of the invention. Computer system 500 is not limited to being a typical personal computer. Rather, computer system 500 may be any type of computing device, such as a server, a portable computing device, or a personal digital assistant. Computer system 500 and variants thereon may be employed in the invention as personal computer 108, mobile phone cell switching system 110, personal computer 112, personal digital assistant 1 13, data analysis server 140, web server 150, or e-mail server 152.

Computer system 500 comprises one or more buses 510 configured to communicate information including addresses, op codes and data. Computer system 500 also comprises one or more processors 502 configured to process information and data according to instructions and other data. Processor 502 may be, but is not limited to, a central processing unit, a microprocessor, an embedded processor, or a special purpose processor.

Computer system 500 may optionally include RAM 504, that is, one or more volatile memory units or other devices or circuits configured to store information, data and instructions. RAM 504 may be random access memory (RAM), static RAM or dynamic RAM. RAM 504 is coupled to bus 510.

The computer system may optionally include ROM 506, that is, one or more nonvolatile memory units or other devices or circuits configured to store static information and instructions. ROM 506 may include read only memory (ROM), programmable ROM, flash memory, electrically programmable ROM (EPROM), or erasable electrically programmable ROM (EEPROM). ROM 506 is coupled with bus 510.

Computer system 500 may optionally include communications interface 508, that is, one or more devices or circuits configured to interface with another electronic device. Communications interface 508 is coupled to bus 510 and may be based on wired communication technology, wireless communication technology, or both. Communications interface 508 may be a serial communication port, a Universal Serial Bus (USB), an Ethernet adapter, an IEEE 1394 bus interface, a parallel port, a small computer system interface (SCSI) bus interface, an infrared (IR) communication port, a Bluetooth wireless communication adapter, a broadband connection, or a connection to the Internet.

The computer system may optionally include keyboard 514, that is, one or more alphanumeric input devices configured to communicate information and command selections from a user. Keyboard 514 may include, but is not limited to, alphabetic, numeric, function and control keys, buttons, selectors or touch-sensitive screens.

Keyboard 514 is coupled to bus 510.

Computer system 500 may optionally include mouse 516, that is, one or more cursor control, indicating, selecting or pointing devices configured to communicate analog, quantitative or selective user input information and command selections to processor 502. Mouse 516 may be a mouse, a track ball, a track pad, an optical tracking device, a joystick, a game controller, a touch screen, or a glove, for example. The mouse is coupled to bus 510. Alternatively or additionally, the functions of the mouse may be directed or activated via input from keyboard 514 using special keys, key sequences or commands.

The computer system may optionally include one or more devices configured to sense, process, generate and recognize voice commands, responses or other words. Voice recognition may replace or augment the functions of keyboard 514, or mouse 516, or both. Such devices may include, for example, microphone 525 and speaker 527, which may also be used for audio capture and reproduction, such as speech, singing and music.

Computer system 500 may optionally include disk 518, that is, one or more devices or circuits configured to store sizable amounts of information, data or instructions. Disk 518 may be a mass storage device, a magnetic disk, an optical disk, a compact disk (CD), a writeable CD, a digital video disk (DVD), a hard disk, a floppy disk, a flash memory, or a memory stick, among others. The disk is coupled to bus 510.

The computer system may optionally include display 512, that is, one or more devices or circuits configured to display pictures, video, text or graphics. Display 512 may be a cathode ray tube (CRT), a flat panel display, a liquid crystal display (LCD), a field emission display (FED), or a heads up display in a vehicle, as examples. The display is coupled to bus 510.

Certain operations, processes and steps are discussed herein that may be realized, in some embodiments of the invention, as a series of instructions including, but not limited to, codes, commands, program operation codes (op codes), pseudo codes (p-codes), firmware or software. These instructions may be executed by various components of computer system 500, including processor 502, programmable controllers within communications interface 508, and programmable controllers within disk 518, among others.

When executed, the instructions control computer system 500 such that it performs specific actions and exhibits specific behavior as described herein. Representations of these instructions may reside within, or be made available via, various media. Such media include memory devices, floppy disks, CDs, computer readable media, or information streams made available via communications interface 508.

Accordingly, the invention as described herein provides a method and system which enables the automatic gathering of data over a period of time on paths taken by a number of commuters and the analysis of this data to provide recommendations for changes in commute paths and practices.

The foregoing drawing figures and descriptions are not intended to be exhaustive or to limit the invention to the forms disclosed. Rather, they are presented for purposes of illustrating, teaching and aiding the reader's comprehension. The invention may be practiced without the specific details described herein. Numerous selections among alternatives, changes in form, and improvements can be made without departing from the principles, spirit or essence of the invention. The invention can be modified or varied in light of the teachings herein, the techniques known to those skilled in the art, and advances in the art yet to be made.

The scope of the invention for which a patent is sought is set forth by the following claims and their legal equivalents.

What is claimed is:

1. A method of gathering and automated analyzing of commute path data, the method comprising:
   receiving an indication of participation from a multiplicity of commuters;
   gathering data over a period of time on commute paths taken by each of the commuters;
   analyzing the commute path data using automated computing means; and
   providing recommendations based on the results of said analyzing steps, wherein the recommendations are selected from suggesting that the subset of commuters carpool, suggesting that the subset of commuters vanpool, suggesting that the subset of commuters take a mass transit route, suggesting that the subset of commuters take a mass transit route augmented with a last mile service, suggesting that the subset of commuters alter their commute time of day, and suggesting that the subset of commuters alter their commute route.

2. The method of claim 1, wherein the indication further specifies a privacy setting for the commuter.

3. The method of claim 1, wherein the indication further specifies a commute constraint for the commuter.

4. The method of claim 1, wherein the indication further specifies a method for the gathering of the commute path data for the commuter.

5. The method of claim 1, wherein said gathering step comprises a method selected from recording time and position data from a global positioning system (GPS) receiver that the commuter carries, recording time and position data from a mobile phone the commuter carries, receiving a departure indication from the commuter, receiving an arrival indication from the commuter and receiving a commute log from the commuter.

6. The method of claim 1, wherein the commute path data is augmented with a likely route that is automatically generated based on a start point, an end point and a map.

7. The method of claim 1, wherein said analyzing step comprises determining a subset of the commuters whose commute paths have a similarity, wherein the similarity is determined employing a similarity metric.

8. The method of claim 7, wherein the similarity metric is selected from having a similar start point, having a similar end point, having a similar start point and a similar end point, having a start point similar to a particular point, having an end point similar to a particular point, having a start point similar to a first particular point and an end point similar to a second particular point, having a start point similar to a particular trajectory, having an end point similar to a particular trajectory, having a trajectory similar to a particular start point and having a trajectory similar to a particular end point.

9. A media containing instructions that control a process when the instructions are read and executed by a system, the process comprising:

receiving an indication of participation from a multiplicity of commuters;

gathering data over a period of time on commute paths taken by each of the commuters;

analyzing the commuter path data; and providing recommendations based on the results of said analyzing steps, wherein the recommendations are selected from suggesting that the subset of commuters carpool, suggesting that the subset of commuters vanpool, suggesting that the subset of commuters take a mass transit route, suggesting that the subset of commuters take a mass transit route augmented with a last mile service, suggesting that the subset of commuters alter their commute time of day, and suggesting that the subset of commuters alter their commute route.

10. The media of claim 9, wherein the indication further specifies a privacy setting for the commuter.

11. The media of claim 9, wherein the indication further specifies a commute constraint for the commuter.

12. The media of claim 9, wherein the indication further specifies a method for the gathering of the commute path data for the commuter.

13. The media of claim 9, wherein said gathering step comprises a method selected from recording time and position data from a global positioning system (GPS) receiver that the commuter carries recording time and position data from a mobile phone that the commuter carries, receiving a departure indication from the commuter, and receiving an arrival indication from the commuter.

14. The media of claim 9, wherein the commute path data is augmented with a likely route that is automatically generated based on a start point, an end point and a map.

15. The method of claim 9, wherein said analyzing step comprises determining a subset of the commuters whose commute paths have a similarity, wherein the similarity is determined employing a similarity metric.

16. The media of claim 15, wherein the similarity metric is selected from having a similar start point, having a similar end point, having a similar start point and a similar end point, having a start point similar to a particular point, having a end point similar to a particular point, having a start point similar to a first particular point and an end point similar to a second particular point, having a start point similar to a particular trajectory, having an end point similar to a particular trajectory, having a trajectory similar to a particular start point and having a trajectory similar to a particular end point.

17. A system configured to gather and analyze commute path data, the system comprising:

an input device configured to receive an indication of participation from a multiplicity of commuters;

a data gathering device configured to gather data over a period of time on commute paths taken by a commuter;

a data analysis device configured to analyze the commute path data and produce an analysis result; and an output device configured to provide a recommendation based on the analysis result, wherein the recommendation is selected from suggesting that the subset of commuters carpool, suggesting that the subset of commuters vanpool, suggesting that the subset of commuters take a mass transit route, suggesting that the subset of commuters take a mass transit route augmented with a last mile service, suggesting that the subset of commuters alter their commute time of day, and suggesting that the subset of commuters alter their commute route.

18. The system of claim 17, wherein said data gathering device comprises a device selected from a global positioning system (GPS) receiver that the commuter carries, a mobile phone that the commuter carries, a device configured to receive a departure indication from the commuter, a device configured to receive an arrival indication from the commuter, and a device configured to receive a commute log from the commuter.

19. The method of claim 17, wherein said data analysis device is further configured to produce the analysis result based on determining a subset of the commuters whose commute paths have a similarity, wherein the similarity is determined employing a similarity metric.

20. The system of claim 19, wherein said similarity metric is selected from having a similar start point, having a similar end point, having a similar start point and a similar end point, having a start point similar to a particular point, having an end point similar to a particular point, having a start point similar to a first particular point and an end point similar to a second particular point, having a start point similar to a particular trajectory, having an end point similar to a particular trajectory, having a trajectory similar to a particular start point and having a trajectory similar to a particular end point.

21. A system for gathering and analyzing commute path data, the system comprising:

a means for receiving an indication of participation from a multiplicity of commuters;

a means for gathering data over a period of time on commute paths taken by each of the commuters;

a means for analyzing the commute path data and for providing an analysis result; and a means for providing recommendations based on the analysis result, wherein the recommendations are selected from a suggestion that the subset of commuters carpool, suggesting that the subset of commuters vanpool, a suggestion that the subset of commuters take a mass transit route, a suggestion that the subset of commuters take a mass transit route augmented with a last mile service, a suggestion that the subset of commuters alter their commute time of day, and a suggestion that the subset of commuters alter their commute route.

22. A computer-implemented method for informing commuters of transportation options, comprising:

gathering commute path data that describes commute paths of a plurality of commuters;

gathering commute path data that describes commute paths of a plurality of commuters;

identifying similar commute paths and associated commuters;

providing information that describes ridesharing arrangements amongst the plurality of commuters.

23. The method of claim 22, wherein gathering commute path data comprises automatically gathering commute path data via mobile phone position information.

24. The method of claim 22, wherein gathering commute path data comprises uploading GPS data from a plurality of GPS devices.

25. The method of claim 24, uploading the GPS data constrained by time parameters.

26. The method of claim 22, wherein gathering commute path data includes route information and time information and the identifying step further comprises identifying subsets of commuters associated with commute paths having similar route information and similar time information.

27. The method of claim 26, wherein the information that describes ridesharing arrangements includes names of commuters.

28. The method of claim 26, wherein the information that describes ridesharing arrangements includes address of commuters.

29. The method of claim 26, wherein the information that describes ridesharing arrangements includes description of mass transit routes.

30. The method of claim 26, wherein the information that describes ridesharing arrangements includes description of vanpool routes.

31. The method of claim 22, wherein;

the commute path data includes route information and time-of-day information;

the identifying step further comprises identifying subsets of commuters associated with commute paths having similar route information; and the information that describes ridesharing arrangements includes information that describes suggested adjustments in a time-of-day at which commuters travel.

32. An apparatus for informing commuters of transportation options, comprising:

means for gathering commute path data that describes commute paths of a plurality of commuters;

means for identifying similar commute paths and associated commuters; and means for providing information that describes ridesharing arrangements amongst the plurality of commuters.

33. An article of manufacture, comprising:

a computer-readable medium configured with instructions for causing a computer to perform the steps of, gathering commute path data that describes commute paths of a plurality of commuters;

identifying similar commute paths and associated commuters; and providing information that describes ridesharing arrangements amongst the plurality of commuters.

* * * * *